US007191950B1

(12) United States Patent
Petrovich et al.

(10) Patent No.: US 7,191,950 B1
(45) Date of Patent: Mar. 20, 2007

(54) PORTABLE TENDERING AND CUSTOMER SERVICE STATIONS AND RELATED SYSTEMS AND METHOD

(75) Inventors: Adam Petrovich, Pittsburgh, PA (US); Jerome Swartz, Old Field, NY (US); James Paul, Allendale, NJ (US); Ian Jenkins, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/552,415

(22) Filed: Apr. 19, 2000

(51) Int. Cl.
*G06K 7/10* (2006.01)

(52) U.S. Cl. ................. 235/472.02; 235/376; 235/385; 713/184

(58) Field of Classification Search ................ 235/385, 235/472, 462, 439, 383, 472.01–472.03, 235/386, 376; 902/10, 32; 713/184
See application file for complete search history.

(56) References Cited

U.S. PATENT DOCUMENTS

| | | | | | |
|---|---|---|---|---|---|
| 4,373,133 | A | | 2/1983 | Clyne et al. | 235/383 |
| 4,887,208 | A | * | 12/1989 | Schneider et al. | 705/28 |
| 5,057,677 | A | * | 10/1991 | Bertagna et al. | 235/380 |
| 5,149,947 | A | | 9/1992 | Collins | 235/462 |
| 5,186,281 | A | | 2/1993 | Jenkins | 186/55 |
| 5,202,825 | A | * | 4/1993 | Miller et al. | 235/472 |
| 5,208,446 | A | | 5/1993 | Martinez | 235/383 |
| 5,250,789 | A | * | 10/1993 | Johnsen | 235/383 |
| 5,310,997 | A | | 5/1994 | Roach et al. | 235/375 |
| 5,311,969 | A | | 5/1994 | Dickover et al. | 186/61 |
| 5,334,821 | A | * | 8/1994 | Campo et al. | 235/380 |
| 5,349,497 | A | * | 9/1994 | Hanson et al. | 16/422 |
| 5,397,882 | A | | 3/1995 | Van Solt | 235/381 |
| 5,397,884 | A | * | 3/1995 | Saliga | 235/382.5 |
| 5,434,394 | A | * | 7/1995 | Roach et al. | 235/375 |
| 5,440,109 | A | * | 8/1995 | Hering et al. | 235/384 |
| 5,468,942 | A | | 11/1995 | Oosterveen et al. | 235/383 |
| 5,489,773 | A | * | 2/1996 | Kumar | 235/462 |
| 5,521,370 | A | * | 5/1996 | Hanson | 235/462.46 |
| 5,536,084 | A | * | 7/1996 | Curtis et al. | 369/75.1 |
| 5,540,301 | A | | 7/1996 | Dumont | 186/61 |
| 5,557,088 | A | | 9/1996 | Shimizu et al. | 235/383 |
| 5,594,228 | A | * | 1/1997 | Swartz et al. | 235/383 |
| 5,646,389 | A | | 7/1997 | Bravman et al. | 235/385 |
| 5,670,768 | A | * | 9/1997 | Modiano et al. | 235/375 |
| 5,736,726 | A | * | 4/1998 | VanHorn et al. | 200/61.02 |
| 5,754,655 | A | * | 5/1998 | Hughes et al. | 380/24 |

(Continued)

FOREIGN PATENT DOCUMENTS

| | | |
|---|---|---|
| NL | 9002296 | 5/1992 |

*Primary Examiner*—Seung H Lee
(74) *Attorney, Agent, or Firm*—Baker Botts LLP; Manu J. Tejwani

(57) ABSTRACT

A portable tendering station includes a movable housing, a removable terminal attached to the housing for acquiring transaction information, and at least one peripheral device attached to the housing and coupled to the terminal for conveying the transaction information and related information to or from a user. Preferably, the terminal includes a display and a device for communicating the information over a wireless communication network, and at least one activation key for activating one or more user functions. The portable tendering station can be easily deployed to various locations within a shopping facility, warehouse, manufacturing facility or the like, and is especially useful for accommodating customers and minimizing delays during peak activity periods.

1 Claim, 8 Drawing Sheets

U.S. PATENT DOCUMENTS

| | | | | | |
|---|---|---|---|---|---|
| 5,763,865 | A | * | 6/1998 | Swift et al. | 235/383 |
| 5,805,416 | A | * | 9/1998 | Friend et al. | 235/472.01 |
| 5,811,774 | A | * | 9/1998 | Ju et al. | 235/455 |
| 5,883,373 | A | * | 3/1999 | Swartz | 235/462 |
| 5,903,878 | A | * | 5/1999 | Talati et al. | 705/26 |
| 5,918,213 | A | * | 6/1999 | Bernard et al. | 705/26 |
| 5,945,653 | A | * | 8/1999 | Walker et al. | 235/380 |
| 5,979,753 | A | * | 11/1999 | Roslak | 235/380 |
| 6,003,008 | A | * | 12/1999 | Postrel et al. | 235/381 |
| 6,032,859 | A | * | 3/2000 | Muehlberger et al. | 235/449 |
| 6,189,788 | B1 | * | 2/2001 | Sherman et al. | 235/383 |
| 6,321,984 | B1 | * | 11/2001 | McCall et al. | 235/381 |
| 6,394,355 | B1 | * | 5/2002 | Schlieffers et al. | 235/462.45 |

* cited by examiner

PORTABLE TENDERING AND CUSTOMER SERVICE STATIONS AND RELATED SYSTEMS AND METHOD

FIELD OF USE

This invention relates generally to computer-assisted shopping and portable tendering stations. More specifically, the present invention is related to portable computer-assisted tendering and customer service stations, and related systems and methods, for use at retail or warehouse facilities.

BACKGROUND OF THE INVENTION

Conventional computer-assisted shopping systems, such as the system described in U.S. Pat. No. 5,468,942 to Oosterveen et al, typically include a computer terminal having an integrated bar-code scanner to record merchandise purchases. If authorized, a user uses the terminal to scan-in bar code information, which in turn is stored in the terminal's internal memory so as to maintain a record of the merchandise selected by the user. In one embodiment, the merchandise record is relayed by wireless local area network and maintained in a centralized computer system. Prior to exiting the store, the information stored in the terminal's internal memory is downloaded through a communication port attached to a terminal dispenser, and a ticket of the customer's purchases is printed on a printer. The customer then proceeds to a check-out register where the customer tenders payment for the purchased merchandise.

Related co-assigned U.S. patent application Ser. No. 08/866,690 filed May 30, 1997 discloses a similar portable shopping and order fulfillment system having enhanced ordering and product data profiles, order collection and order fulfillment capabilities. The disclosure of U.S. patent application Ser. No. 08/866,690 is hereby expressly incorporated herein by reference, as are the disclosures of its parent U.S. patent application Ser. No. 08/780,023 filed Dec. 20, 1996 and its grandparent U.S. patent application Ser. No. 08/706,579 filed Sep. 5, 1996.

While conventional computer-assisted shopping systems can enhance and expedite a consumer's shopping experience, there still remains a need for providing tendering or customer service stations when the customer is ready to actually make payment for and/or take possession the purchased products. Further, in retail establishments offering computer-assisted shopping services, a need remains for providing traditional customer checkout and tendering capabilities for customers who are unwilling or unable to obtain identification or other required customer cards.

U.S. application Ser. No. 09/299,228, which is assigned to Symbol Technologies, Inc., the assignee of the present invention, thus describes multi-lane tendering stations constructed and arranged so as to reduce customer waiting times and to improve the overall efficiency of the shopping experience. Such tendering stations allow the servicing of one or more customer queues, and are used to tender payment from customers wishing to complete a purchase transaction. A typical multi-lane tendering station may include, for example, a bar-code scanner for scanning and identifying the items to be purchased, a processor coupled to the bar-code scanner for itemizing and totaling the identity and price of the items, and a printer for printing the itemized list. Such a station can optionally include a scale for weighing items, a bar-code label panel for identifying items being weighed, a packing station for packaging the items by the customer and a card reader for receiving payment directly at the self-service scanning station. The disclosed multi-lane systems therefore allow shopping establishments to service a greater number of customers while reducing the time and costs associated with customer check-out.

The above-described multi-lane check-out systems, however, are usually limited in number and are permanently fixed to a particular section of the retail facility. Thus, long lines and delays may still result especially during heavy shopping periods, i.e., the day after Thanksgiving ("Black Friday"), the day after Christmas, advertised sales event, etc. Therefore, a need exists for customer service or tendering stations that can be easily deployed to a variety different locations within a store so as to accommodate consumers during peak activity periods.

OBJECTS OF THE INVENTION

The aforedescribed limitations and inadequacies of conventional customer service and tendering stations are substantially overcome by the present invention, in which a primary object is to provide a portable tendering station that can be easily deployed to a variety of different locations within a store, warehouse, manufacturing facility or other establishment so as to accommodate users during peak activity periods.

Another object is to provide an improved tendering system and method that reduces the waiting time of the customer especially during busy shopping periods.

Still another object of the present invention to provide an improved tendering system that allows customers to purchase merchandise from any number of locations within a shopping establishment.

Yet another object of the invention to provide an efficient tendering station for receiving payment from customers who use computer-assisted shopping.

SUMMARY OF THE INVENTION

An improved tendering station is disclosed having: a movable housing; a removable terminal attached to the housing for acquiring transaction information, the terminal having a display and a device for communicating the information over a wireless communication network, and at least one activation key for activating one or more user functions; and at least one peripheral device attached to the housing and coupled to the terminal for conveying the transaction information and related information to or from a user. The tendering station of the present invention is portable and can be easily deployed, for example, to a variety different locations within a store during busy shopping periods.

In another preferred embodiment of the present invention, a portable customer service station is provided for facilitating a customer transaction in a retail facility. The customer service station includes: a movable housing and a removable handheld terminal attached the housing for acquiring transaction information, the terminal having a display, a wireless radio for communicating the information over a wireless communication network, at least one activation key for activating one or more user functions, and a scanner for reading bar code information. The customer service station further includes a customer display attached to the housing and coupled to the terminal for displaying the transaction information and related information to a customer; a printer device for printing receipts or transaction reports and a magnetic stripe reader to read credit cards.

In yet another preferred embodiment of the present invention, a portable tendering station is provided for facilitating customer transactions at a retail facility. The portable tendering station includes: a movable housing; a cradle interface attached to the housing; a removable handheld terminal connected to the cradle interface for acquiring transaction information, the terminal having a display, a wireless radio for communicating the information over a wireless communication network, at least one activation key for activating one or more user functions, and a scanner for reading bar code information; and at least one peripheral device attached to the station and in communication with the terminal via the cradle interface for conveying the transaction information and related information to or from a customer, the at least one peripheral device being used to complete the transaction.

In still another preferred embodiment of the present invention, a customer service station is provided that can be used as a fixed or portable "wrap stand". The customer service station includes: a housing; a communication interface attached to the housing for receiving and transmitting transaction and related information over a wireless communication network; and at least one peripheral device attached to the customer service station and coupled to the communication interface for conveying the transaction and related information to or from a customer, the at least one peripheral device being used to complete the customer transaction.

The present invention also includes preferred embodiments of a system for providing tendering and customer services. In a first "thick client" embodiment of the system, the system includes a host computer for processing transaction data; a controller coupled to the host computer for communicating the transaction information to and from the host computer; a wireless communications network coupled to the controller for communicating the transaction information to and from the controller; and a portable station in communication with the network for providing the transaction information to the network. The portable station includes: a movable housing; a removable terminal attached to the housing for acquiring the transaction information, the terminal having a display and a device for communicating the information over the network, and at least one activation key for activating one or more user functions; and at least one peripheral device attached to the housing and coupled to the terminal for conveying the transaction information and related information to or from a user.

In a second "thin client" embodiment of the customer service and tendering system, the system further includes a server coupled to the controller for processing the transaction information and communicating the transaction information to and from the controller. The removable terminal of the second embodiment further includes an Internet browser as an interface between the server and a user.

A portable "escorted shopper" terminal is also provided for use with the above-described tendering and customer service stations. Such a terminal includes: a housing; a display disposed on the top surface of the housing; at least one activation key for activating one or more user functions; a magnetic strip reader adapter attached to the housing for reading magnetically coded information from a customer card, the magnetically coded information representing at least in part the transaction information; and a device for communicating the transaction information over a wireless communication network.

In another aspect of the present invention, a method is provided for controlling the number of customer service stations in a retail facility so as to manage fluctuations in customer traffic. The method includes the steps of providing a portable customer or checkout station having a portable terminal and at least one peripheral device as described above; positioning the portable checkout station at an appropriate location within the facility so as to minimize customer traffic within the facility; running a register application on the terminal wherein the terminal functions to collect the transaction information pertaining to the customer's purchase and transmitting such transaction information to a host computer; using the portable terminal to collect information pertaining to items selected by the customer to be purchased; generating a transaction report; tendering payment; and placing items in a receptacle for delivery to the customer. Optionally, one of the peripheral devices, such as a magnetic strip reader, is used to collect information pertaining to items selected by the customer to be purchased.

In addition, a method for providing a manager's service station is disclosed having the steps of issuing the station to a manager, assigning the station to the manager, and allocating all activities run on the station to the manager. Preferably, the service station includes a display, wireless radio, a removable terminal, bar code scanner and telephone services.

Further objects, features and advantages of the invention will become apparent from the following detailed description taken in conjunction with the accompanying figures showing illustrative embodiments of the invention.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein.

DETAILED DESCRIPTION OF THE PREFERRED EMBODIMENTS

Figure 1:
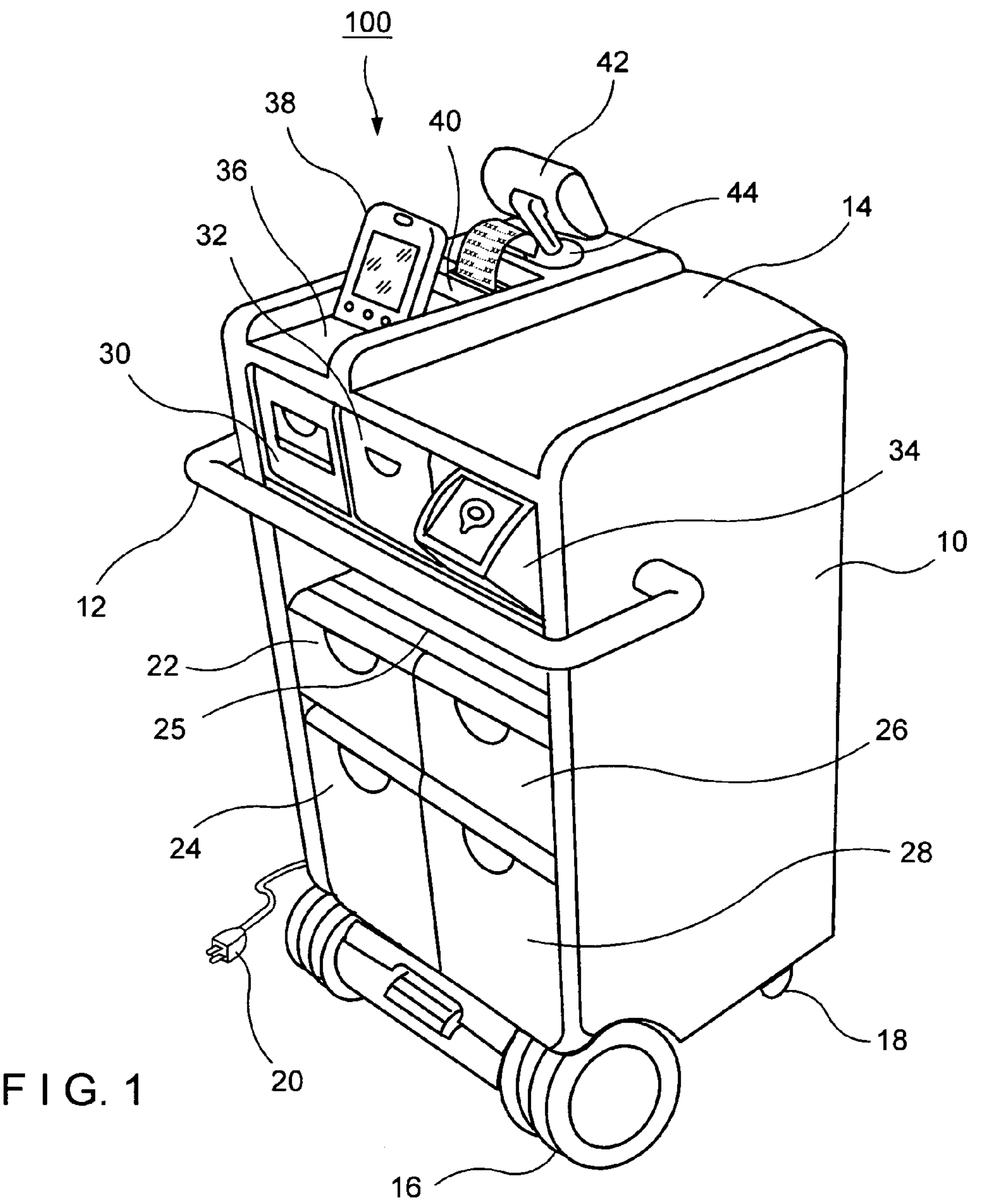
FIG. 1 is an illustration of a customer service station in accordance with a preferred embodiment of the present invention.

FIG. 1 shows an illustration of a tendering station 100 arranged as a customer service station for facilitating customer transactions at a retail facility. The tendering station 100 includes a movable housing 10, a removable terminal 38 attached to the housing 10 for entering transaction information about products to be purchased, and a peripheral device, such as customer display device 42 coupled to the terminal 38 for displaying the transaction information and other related information. The transaction information may include, for example, the cost for individual items, a total cost, item identification information, customer credit card information, etc. Related information may include, for example, the time, date and location of the transaction, special instructions or messages, advertisements or information pertaining to related items, etc. In a preferred embodiment, the removable terminal 38 includes a display and a communication device, such as the Spectrum 24™ wireless radio sold by Symbol Technologies, Inc., for communicating voice and data information to a communication network. The communication network can be, for example, a wireless communication network such as the Spectrum 24™ system sold by Symbol Technologies, Inc. Preferably, the customer service station is self-powered and can be deployed anywhere in a retail or storage facility, for example, while maintaining a communication link to a host computer.

Although described in the context of a retail or shopping establishment, it is known and understood that the tendering station of the present invention can be arranged and adapted for use in any facility, such as warehouse, factory, hospital, etc., where there is a need for tracking and/or tendering purchase products, inventory items or services. It is also understood that the removable terminal 38 and peripheral devices of tendering station 100 can be arranged in a variety of configurations that would fall within the scope of the present invention.

Figure 2:
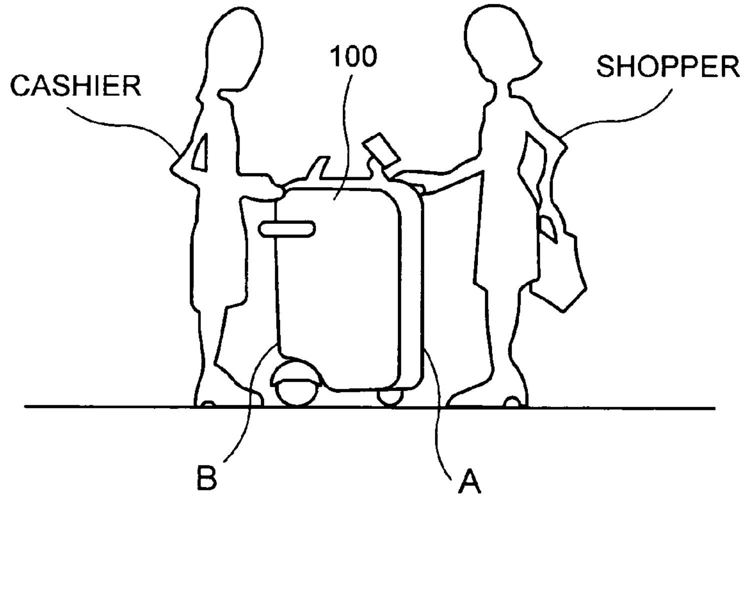
FIG. 2 is a side view illustration of the customer service station of FIG. 1.
Figure 3:
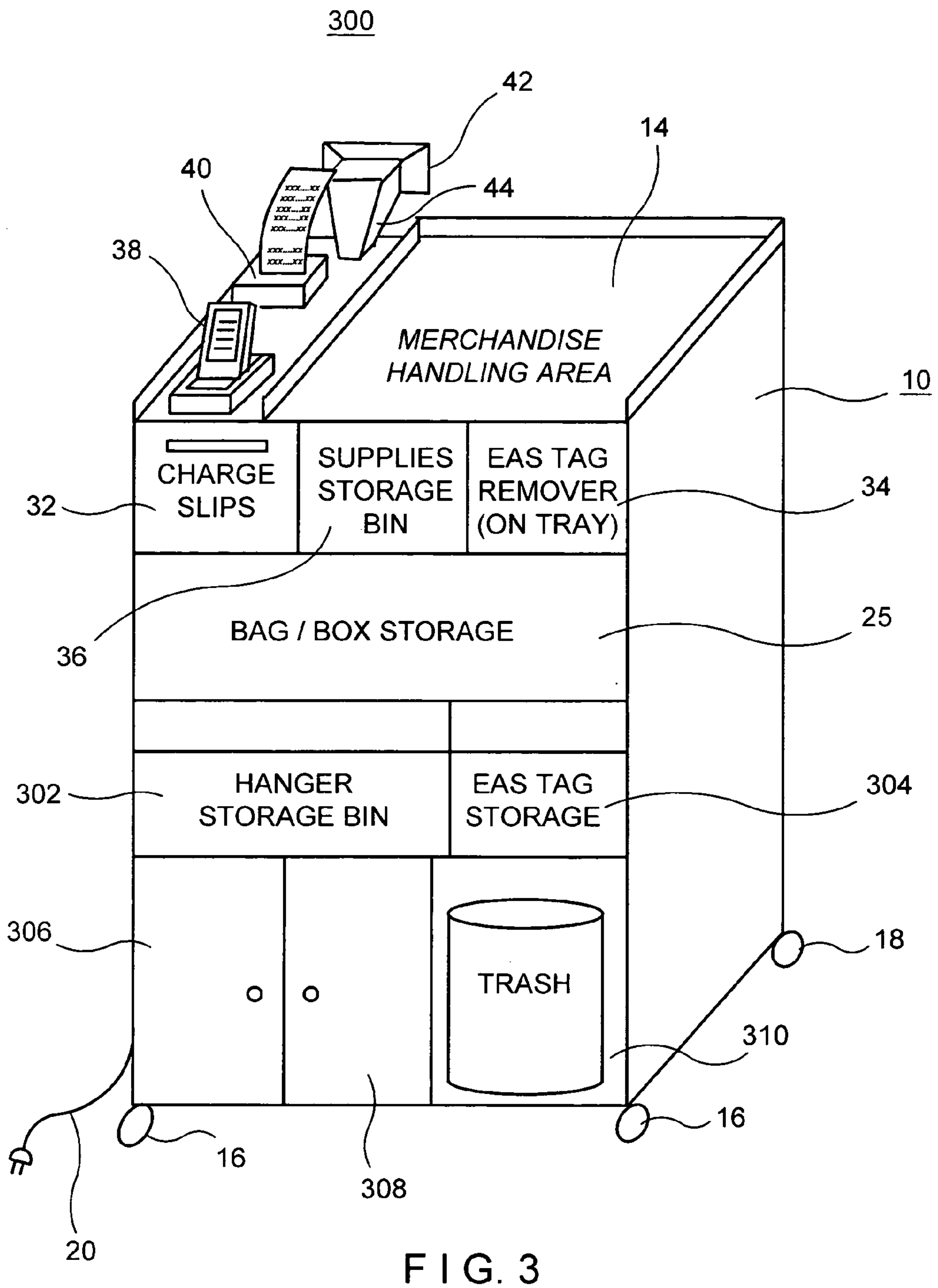
FIG. 3 is an illustration of a customer service station in accordance with another preferred embodiment of the present invention.

As shown in FIGS. 1 and 3, the movable housing 10 is preferably a rectangularly-shaped cabinet made from metal, plastic or other suitable materials mounted on wheels 16 and 18 or other suitable movable members. The housing 10 has a front or "customer" side A, a back or "cashier" side B, as shown in FIG. 2, and a top surface for mounting the removable terminal 38 and peripheral devices 40 and 42 and for placing products to be purchased. Storage compartments, bins, drawers and the like 22, 24, 25, 26, 28, 30, 32 and 34 are provided on the cashier side of the housing, along with a merchandise or item handling area 14 on the top side of the housing 10 extending from the customer side A to the cashier side B. The storage areas 22, 24, 25, 26, 28, 30, 32 and 34 can be used, for example, for storing cash, coupons, credit card receipts, charge slips, EAS tags, boxes, hangers, trash, etc. The housing can also include a tag remover 34 for removing EAS or other tags or labels from items being purchased. Optionally, as shown in FIG. 1, a handle bar 12 or suitable member or members are provided on the cashier side for maneuvering the customer service station as required.

As with the removable terminal and peripheral devices, the features of the housing can be arranged in a variety of configurations all falling within the scope of the present invention. FIG. 3, for example, shows a variation of the tendering station 300 having a hanger storage bin 302, an EAS tag storage area 304, storage compartment areas 306 and 308, and a trash compartment 310.

Mounted on the top side of the housing 10 adjacent to the merchandise handling area 14 is the removable terminal 38. Preferably, the removable terminal 38 is a handheld portable computing device such as described in U.S. patent application Ser. Nos. 09/232,142 and 09/087,086 assigned to Symbol Technologies, Inc., and which are hereby incorporated by reference. The handheld terminal includes a display, such as a touch screen. The handheld terminal further includes a transceiver for providing a wireless communication link to a local area network (LAN). Further, as described in application Ser. Nos. 09/232,142 and 09/087,086, a preferred embodiment of the handheld terminal includes computer memory and corresponding software for assisting customers by identifying customer preferences and inventory availability, software for managing the power requirements of the terminal and tendering station, and software for sending and receiving messages to and from a host computer. The terminal further includes software for controlling terminal peripherals, such as a bar-code scanner, magnetic stripe reader and telephony circuits. In some embodiments, discussed below, software is provided on the terminal for controlling the POS user interface. Optionally, the handheld terminal can further include one or more locking or alarm mechanisms, such as a "hard key" pushbutton or a "soft" key on a touch sensitive display, for preventing theft or unauthorized use of the handheld terminal and/or tendering station.

Also mounted on the top side of the housing are peripherals, such as a receipt printer 40 and a customer display 42, used for conveying information about the purchase transaction to be made by the customer. The peripherals 40 and 42 are shown by way of example and not limitation, and can also include, for example, a magnetic stripe reader for reading customer cards and transmitting transaction information to the terminal for processing by the terminal, a keyboard for entering data onto the terminal, a scanner for reading bar codes and transmitting bar code information to the terminal, and a telephone headset having a suitable transceiver receiving and transmitting audio data to the terminal for retransmission from the terminal to the communication network. The telephone headset can be, for example, the packet-based NetVision™ I/P telephone available from Symbol Technologies. The telephone arrangement for the terminal is further described in the above referenced earlier application Ser. Nos. 08/780,023, and may be embedded in The Spectrum 24 radio transceiver, with a peripheral headset. The customer display 42 is preferably a liquid crystal display (LCD) or light-emitting display (LED) having an adjustable support 44 mounted to the top side of the housing. The support 44 can be adjusted to accommodate the customer and folded or retracted during the transport or repositioning of the tendering station 100.

The tendering stations of FIGS. 1 and 3 further include a power cord and plug 20 for connecting to an external power source and/or one or more rechargeable batteries for powering the electronic components of the tendering station, e.g., the removable terminal 38 and peripheral devices 40 and 42.

In accordance with a preferred embodiments of FIGS. 1 and 3, the tendering station of the present invention is capable of performing functions performed by conventional tendering stations, for example, open register, close register, log in, log out, sales (cash and non-cash) totals, manager voids, credit card transactions, security validations, limit changes on sales, date/time synchronization, printing, tax tables, algorithm keys, check digit algorithm, override, deferred billing, mark down, discounts, price inquiry, reprint, security notification, training mode, and diagnostics.

Figure 4:
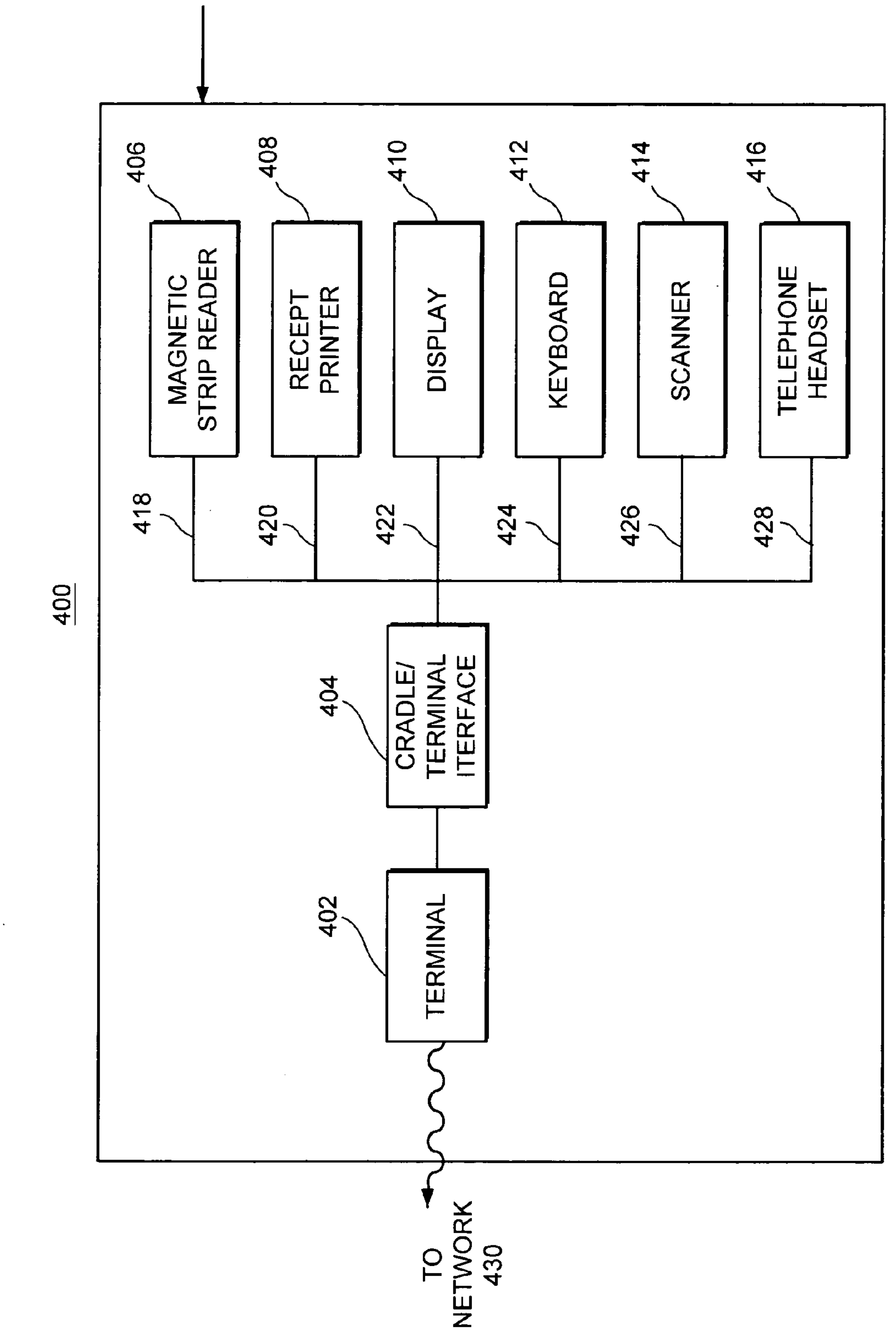
FIG. 4 is a block diagram showing the components of a customer service station in accordance with another preferred embodiment of the present invention.

FIG. 4 is a block diagram showing another preferred embodiment of the customer service station 400 of the present invention. The customer service station 400, which can be configured in a suitable housing as shown in FIGS.

1 and 3, includes a removable terminal 402, a cradle or terminal interface 404 for receiving and mating with the terminal 402, and at least one peripheral device 406, 408, 410, 412, 414 and 416 mounted onto the station housing and in communication with the terminal 402. The peripheral devices 406, 408, 410, 412, 414 and 416 are used for completing a customer transaction and can include, by way of example and not limitation: a magnetic stripe reader 406 for reading customer cards, i.e., preferred customer cards, discount cards, credit cards, etc., and transmitting customer card information to the terminal 402 for processing by the terminal 402; a keyboard 412 for entering data into the terminal 402; a bar code scanner 414 for reading bar codes and transmitting corresponding bar code information to the terminal 402; a printer 420 for receiving data from the terminal and printing customer receipts, transaction reports and/or other information pertaining to the customer transaction; a display device 410 for displaying transaction and related information to a customer; and a telephone headset 416 including a transceiver for receiving and transmitting audio information to the terminal 402 for retransmission over the wireless communication network 430. The removable terminal 402 and peripheral devices 406, 408, 410, 412, 414 and 416 are linked together via hardwire, short range RF, or infrared links 418, 420, 422, 424, 426 and 428 provided via the cradle/interface 404.

Preferably, the removable terminal 402 includes a display, a wireless radio for communicating voice and data information over a wireless communication network 430, and at least one user activation key having a locking mechanism or alarm mechanism to prevent theft. The activation key can be a "hard" key or a "soft" key displayed on a touch sensitive display. Further, the removable terminal 402 can include its own bar code scanning device.

Figure 5:
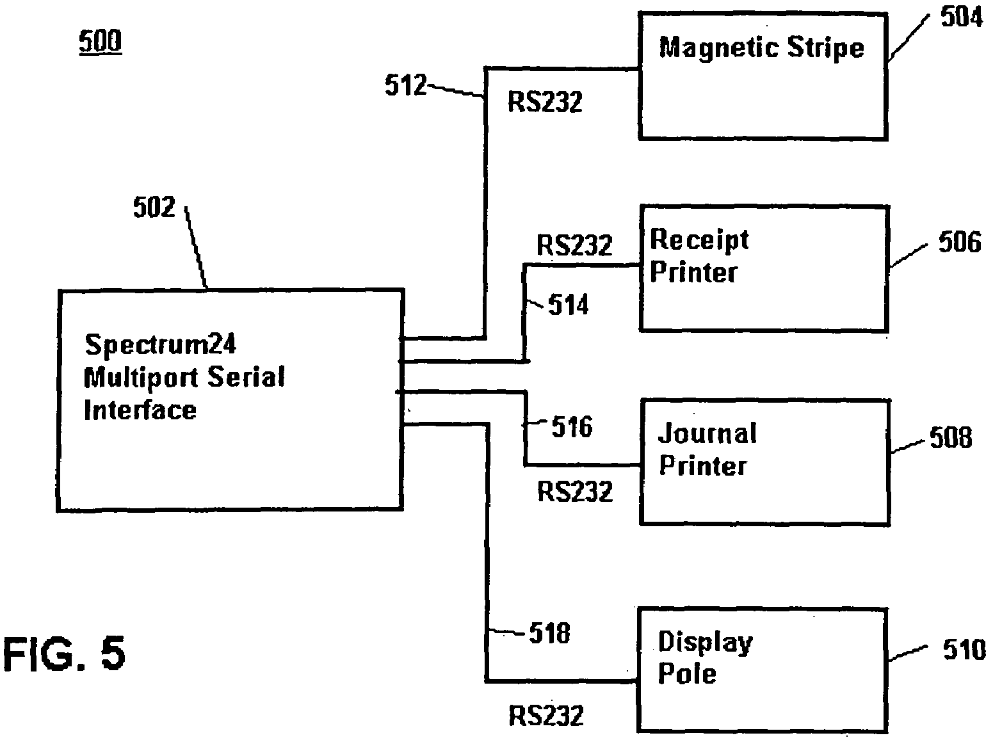
FIG. 5 is a block diagram showing the components of a customer service station in accordance with another preferred embodiment of the present invention.

FIG. 5 is a block diagram showing the components of a customer service station 500 in accordance with an alternative embodiment of the present invention. The customer service station 500 can be used as a portable or fixed "wrap stand" in a shopping establishment. The customer service station 500 includes: either a fixed or portable housing as shown in FIGS. 1 and 3; a communication interface 502 for wireless communications, such as the Spectrum 24™ multiport serial interface available from Symbol Technologies; and one or more peripheral devices including but not limited to a magnetic stripe reader 504, a receipt printer 506, a journal printer 508 for printing a transaction report, and a customer display 510. The peripherals are coupled to the communication interface via corresponding RS-232 interfaces 512, 514, 516 and 518. The wireless communication interface 502 allows for remote addressing of the peripheral devices and direct communication with the peripheral device via RF communication links.

Figure 6:
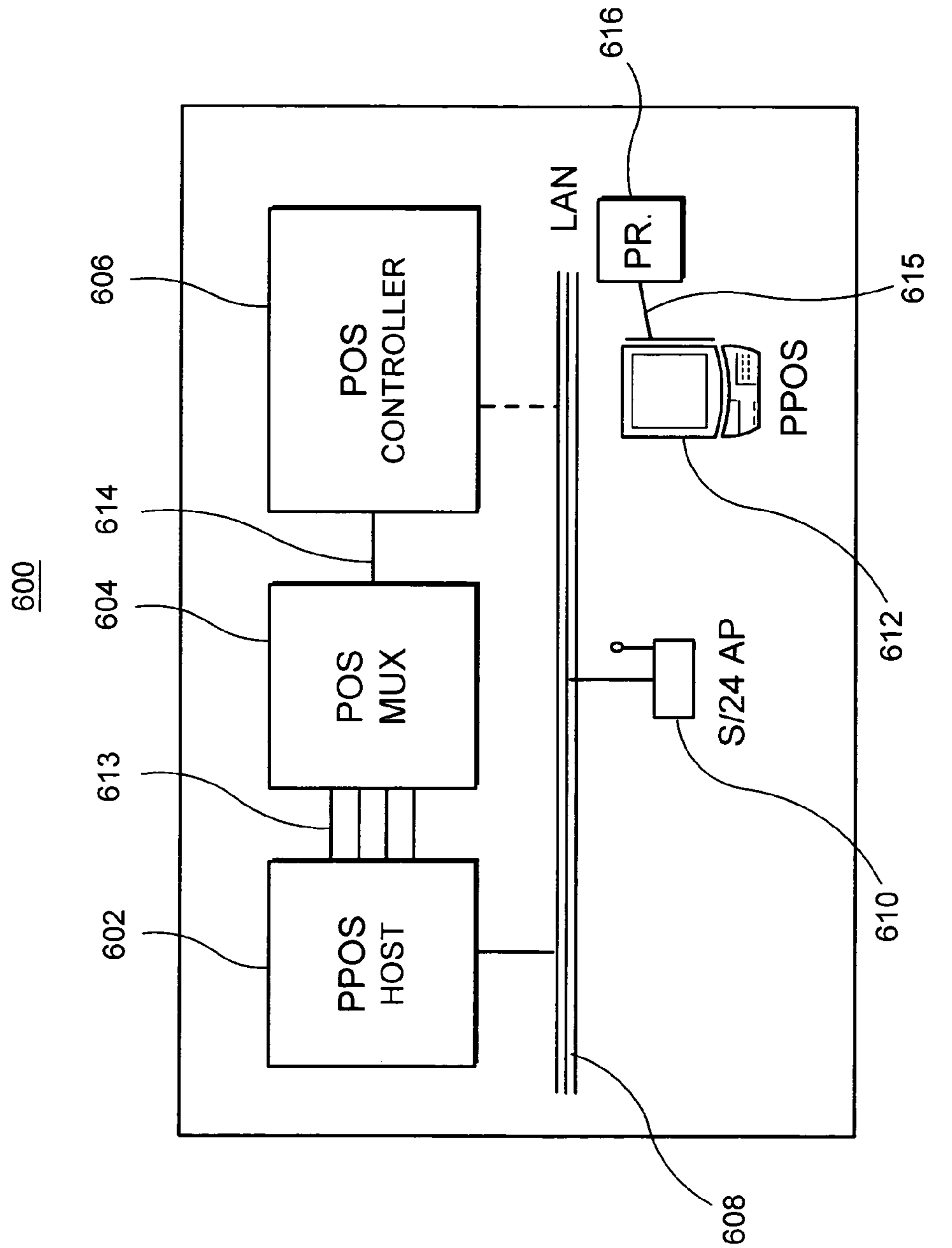
FIG. 6 is a block diagram of a portable point-of-sale (POS) system in accordance with preferred embodiment of the present invention.

FIG. 6 is a block diagram of a portable point-of-sale (POS) system 600 according to a preferred embodiment of the present invention. The portable POS system 600 includes a PPOs host computer 602 coupled to one or more POS controllers 606 (only one shown) via a POS multiplexer 604. Transactions are entered, e.g., by scanning bar codes, on PPOS terminal 612 and sent by RF signal to access point 610. Thereafter access point 610 sends the transaction data to PPOS Host system 602, which provides protocol conversions to emulate a wired POS terminal. The transaction data is thereafter sent by serial communications link 613 to multiplexer 604 and the to POS controller 606 via communications link 614. Alternatively, the transaction data may be provided to POS controller 606 via LAN 608. Responses are sent in reverse order to the PPOS Host 602, reformatted and sent to the PPOS terminal 612. When the transaction is complete, a receipt is printed on portable printer 616 which is connected to terminal 612 by short range RF, infrared or wired link 615.

In one arrangement of the system 600, terminal 612 is provided with a POS user interface program to provide displays and prompts to the user to gather a complete package of data as required to process a transaction, including display of items scanned, calculation of purchase total, sales tax, and reading of credit card data. In this instance terminal 612 may formulate a complete POS message to be communicated to POS controller 606 over LAN 608 from access point 610, and emulation of POS terminal characteristics in POS Host 602 is not required.

In an alternate arrangement the program provided on terminal 612 is a "browser" program which provides processing for the display and input commands. The browser communicates with PPOS Server 602 which provides all logic functions for processing the transaction and downloads the display content to terminal 612. Alternatively, the logic functions can be performed on a special application on POS Controller 606.

By providing a browser program in terminal 612, further enhanced features can be provided. Terminal 612 can be used to provide inventory information in response to a customer inquiry to the user of terminal 612. In connection with such use, the bar-code reader can be used to identify a displayed product, such as furnishings, appliances and the like. The identifying data can be communicated to the PPOS Server 602 and used by Server 602 to retrieve inventory data, such as available colors, options, delivery schedules, etc. Additionally, the browser program in terminal 612 can be used to retrieve further customer information about a product, either from files stored on the host computer or by initiating a link to the website of the product supplier on the internet. Further, the terminal 612 can provide a link to a Customer Relationship Management System to provide specialized displays, specialized customer pricing and marketing data. Further, by providing wireless telephone service, a customer can resolve credit questions with a customer service representative or can preview the content of a sound recording.

Figure 7:
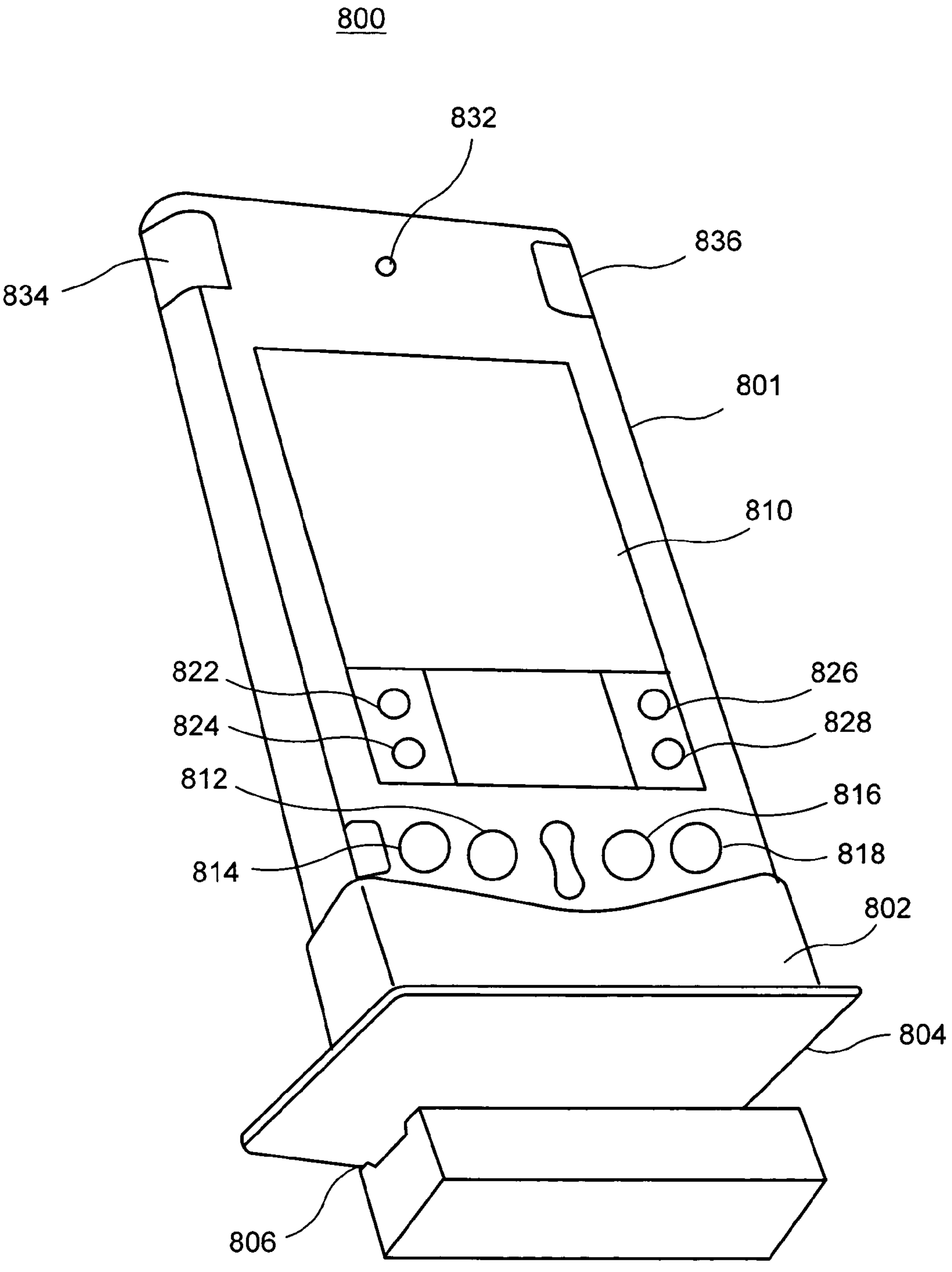
FIG. 7 is an illustration of a portable escorted shopper terminal in accordance with a preferred embodiment of the present invention.
Figure 8:
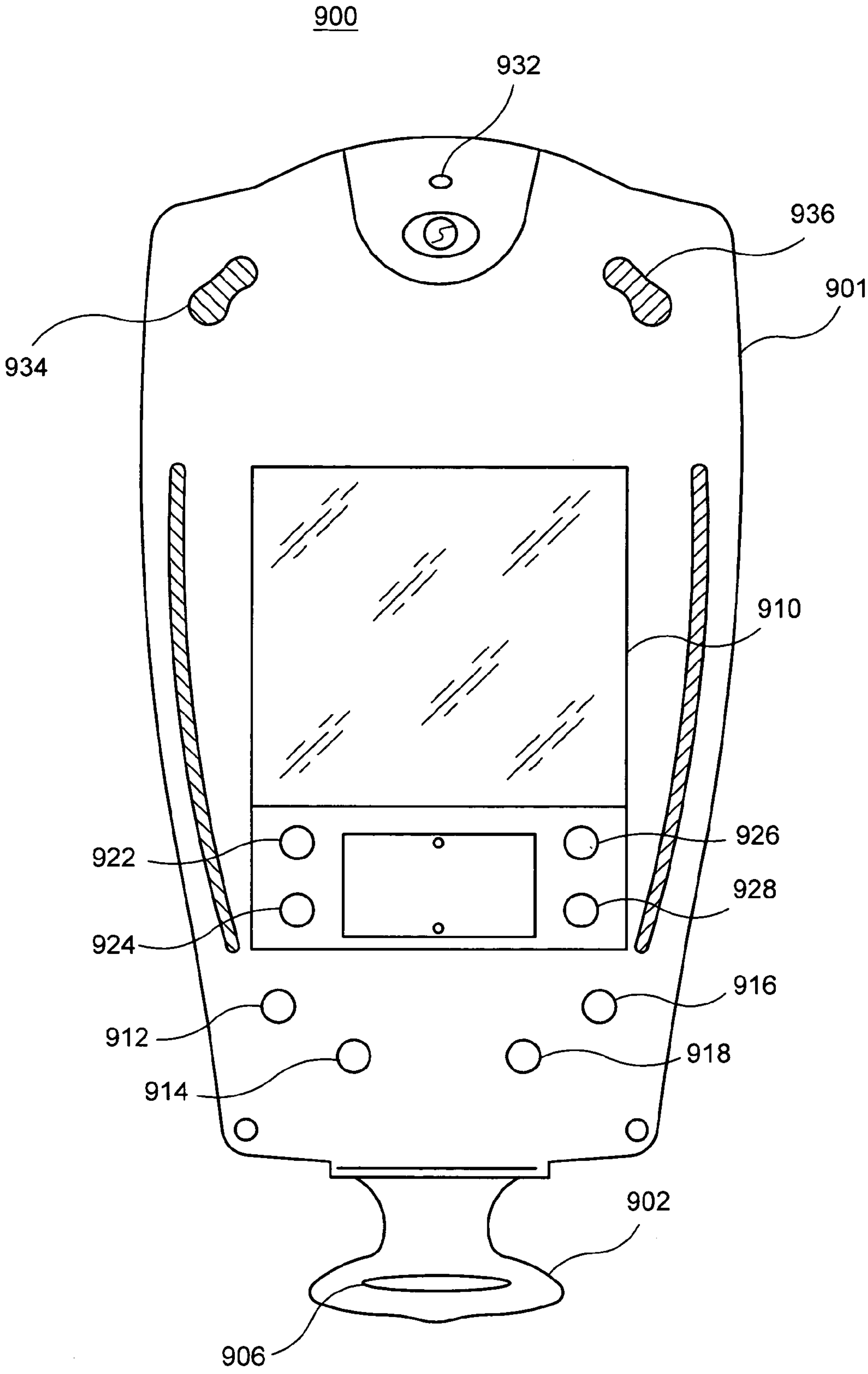
FIG. 8 is an illustration of a portable escorted shopper terminal in accordance with another preferred embodiment of the present invention.

FIG. 7 illustrates a portable escorted shopper terminal 800 that provides added flexibility and versatility to the customer service stations of FIGS. 1–3. The portable escorted shopper terminal 800 of FIG. 8 includes a portable handheld terminal as described, for example, in U.S. patent application Ser. Nos. 09/232,142 and 09/087,086, and a magnetic strip reader adapter 802 for reading a customer card 804. The magnetic strip reader adapter 802 includes a card insertion slot 806 and is constructed and arranged so as to fit over the bottom part of the housing 801 of the portable terminal. FIG. 8 illustrates an alternative embodiment of the portable escorted shopper terminal having a terminal adapter 902 with card insertion slot 906.

Figure 9:
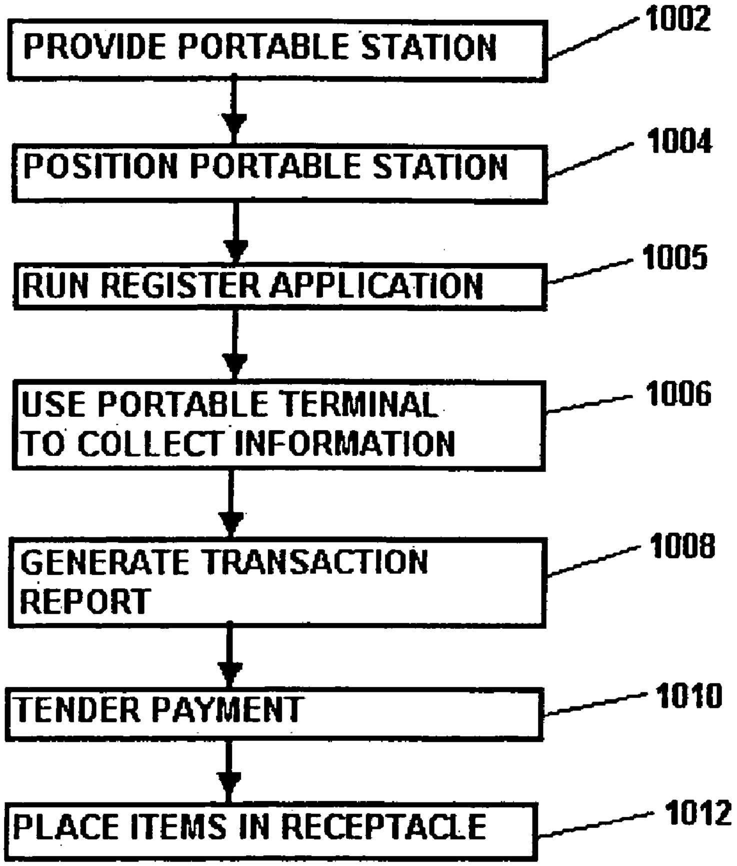
FIG. 9 is a flow diagram of a method for controlling the number of customer service stations in a retail facility so as to manage fluctuations in customer traffic.

The various embodiments of the customer service station described above can be operated in a shopping establishment as described below with reference to FIG. 9. First, a portable customer station as described above is provided and positioned at a desired location within the retail establishment, steps 1002 and 1004. A cashier then activates the customer service station, opens the cash register and logs in via the removable terminal. In step, 1006 Items to be purchased are then processed, e.g., items are scanned using a built-in scanner of the removable terminal or a separate bar code scanner mounted on the housing of the customer service station, and further processed (if so desired) by performing a price inquiry, canceling the item or marking down the price of the item. After the purchase items are processed, the customer's card is then processed using the magnetic stripe reader. The customer accepts/authorizes the charge, and the removable terminal is used to capture the customer's signature. A receipt printer is then used to print charge and/or customer receipts or reports.

Figure 10:
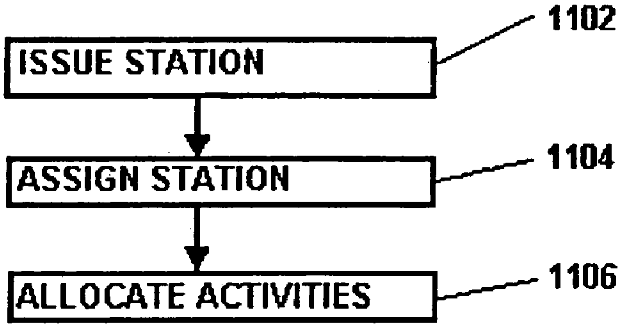
FIG. 10 is a flow diagram of a method for providing a manager's service station.

The terminals of the present invention can also be used in connection with providing communications and data access services to management personnel. Referring to FIG. 10, at step 1102 a terminal can be issued to a manager on the start of his shift, or when he leaves a fixed office location, etc. After the terminal is issued, the manager logs onto the system using the terminal at step 1104, and possibly using his or her employee identification badge, which may include a bar-code or magnetic stripe. Entry of an access code may also be required. After logon by the manager, the system assigns the terminal to the manager and will allocate functions to the terminal at step 1106 according to the privileges granted to the manager. For example, using a browser program, the system can provide a menu of applications for manager use that is not available to a cashier, such as telephone service, message paging, e-mail, and access to business or financial programs and data. Different functions may be made available to different managers according to their level and responsibilities.

Although the present invention has been described in connection with particular embodiments thereof, it is to be understood that various modifications, alterations and adaptions may be made by those skilled in the art without departing from the spirit and scope of the invention. It is intended that the invention be limited only by the appended claims.

What is claimed is:

1. In a system wherein a host processor communicates with a plurality of mobile terminals using radio data communication, wherein said mobile terminal have radio devices for communicating information via wireless radio, a method for controlling functions available to mobile terminal users, comprising:

issuing a mobile terminal to a user;

receiving identification data specific to said user on said mobile terminal and communicating said identification data to said host processor via wireless radio;

operating said host processor to hierarchically determine authorized functions of said mobile terminal to be made available to said user, using said identification data received via wireless radio;

accordingly, communicating a message using radio data communication to said terminal identifying available authorized functions for said user of said mobile terminal; and operating said host processor to provide said mobile-terminal user selected ones of said authorized functions to said terminal.

* * * * *